Feb. 7, 1961  F. J. LYNCH  2,970,494
AUTOMATIC TRANSMISSIONS
Filed April 13, 1960  2 Sheets-Sheet 1

INVENTOR.
FRANCIS J. LYNCH
BY *J. Ledermann*
ATTORNEY

Feb. 7, 1961 F. J. LYNCH 2,970,494
AUTOMATIC TRANSMISSIONS
Filed April 13, 1960 2 Sheets-Sheet 2
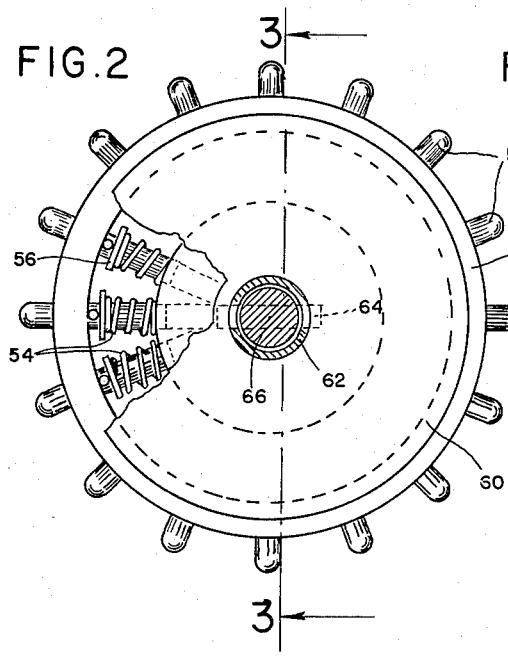
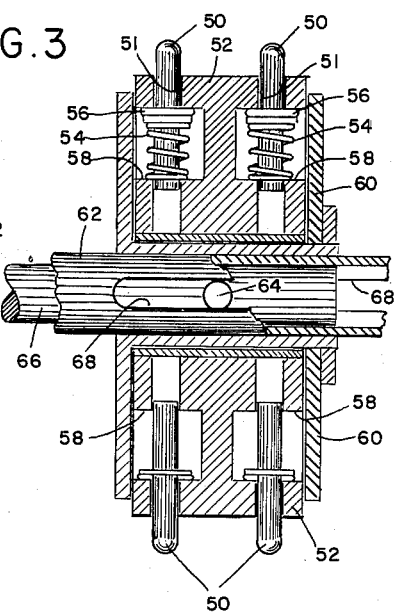
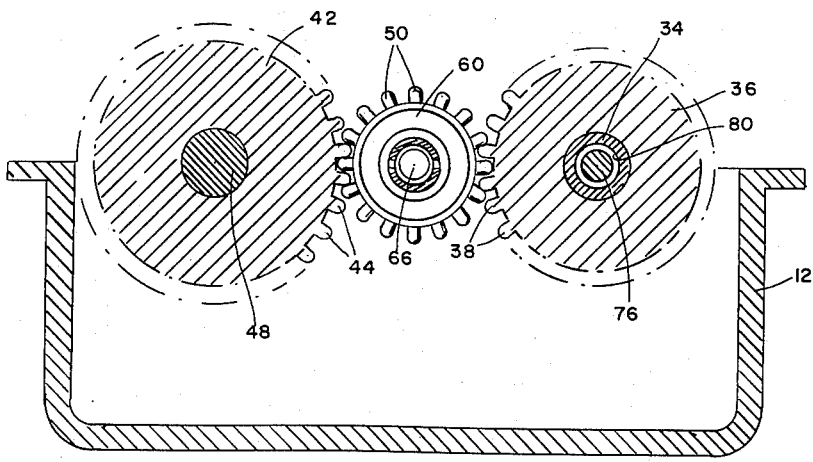
INVENTOR.
FRANCIS J. LYNCH
BY *J. Ledermann*
ATTORNEY

United States Patent Office 2,970,494
Patented Feb. 7, 1961

2,970,494

AUTOMATIC TRANSMISSIONS

Francis J. Lynch, 14 Beach Road, Great Neck, N.Y.

Filed Apr. 13, 1960, Ser. No. 21,932

5 Claims. (Cl. 74—336.5)

This invention relates to transmission systems and, more particularly, to a variable speed transmission.

Automatic variable speed transmission devices have a wide variety of uses in automotive, machinery, and power plant fields. It is therefore an object of the present invention to provide a variable speed transmission system, especially adapted for automotive vehicles, while is extremely simple in construction, efficient in operation, and substantially foolproof during extended periods of use.

Another object of the present invention is to provide a variable speed transmission which can be readily used in all types of automotive vehicles which will provide for the smooth and uninterrupted transmission of power from the driving shaft to the driven shaft throughout all of the entire range of the system.

Still an additional object of the present invention is to provide a variable speed transmission system of the type described having a positive drive connection between the input shaft and the driving shaft of the system, and a governor operated control mechanism for automatically varying the ratio of the driving to the driven shafts without an interruption or uneven transmission of power.

All of the foregoing and still further objects and advantages of this invention will become apparent from a study of the following specification, taken in connection with the accompanying drawing, wherein:

Figure 2 is a front elevational view, with parts broken away, of an idler gear assembly forming a part of the present invention;

Figure 3 is a transverse sectional view taken along line 3—3 of Figure 2; and

Figure 4 is a fragmentary sectional view taken along line 4—4 of Figure 1.

Figure 1:
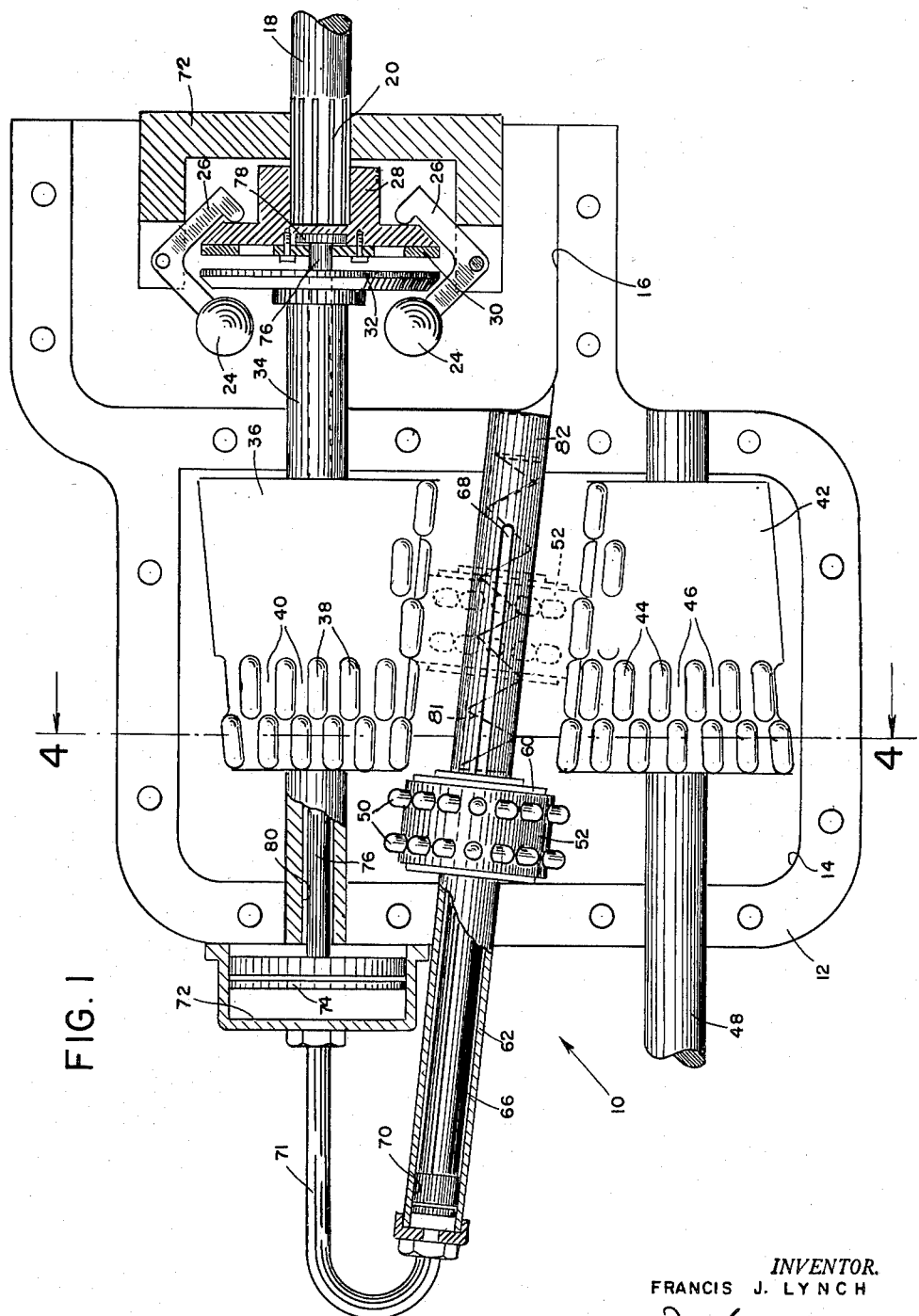
Figure 1 is a longitudinal cross sectional view, with parts broken away, of a variable speed transmission casing made in accordance with the present invention, showing the manner in which the various operating parts cooperate with each other.

Referring now to the drawing, a variable speed transmission system 10 made in accordance with the present invention is shown to include a casing 12 having a main gear compartment 14 and an auxiliary compartment 16. The output shaft of the engine includes a power shaft 18 having a splined section 20 upon which a governor spider 22 is secured for rotation therewith.

The governor spider 22 includes a plurality of circumferentially mounted pivotally supported levers 26 having weights 24 at one outermost end. The levers and weights are so arranged as to cause the levers 26 to act upon the rear side of a clutch plate 28 that is slidably supported upon the splined section 20 of the input shaft, so as to move into driving engagement with the cooperating friction plate 32 of the driving shaft 34 of the system. A layer of friction material 30 serves as a wear surface for transmitting power from the input shaft 18 to the driving shaft 34 in the aforementioned manner.

A conically shaped driving gear 36 is secured to the driving shaft 34 and has a plurality of longitudinally spaced circumferential courses of drive lugs 38 mounted thereupon with spaces 40 therebetween. An identically shaped driven gear 42 mounted upon a driven shaft 48, has reversely arranged lugs 47 and spaces 46. The spacing between the lugs in the courses 38 and 44 is constant so that the number of lugs in the courses 38 increases progressively from left to right, Fig. 1, and the number of lugs in the courses 44 decreases progressively from left to right. The facing surfaces of the driving and driven gears 36, 42 are parallel, as is clearly shown in Figure 1, and therebetween an idler gear assembly is slidably supported upon an idler shaft 62.

As is more clearly shown in Figures 2 and 3 of the drawing, the idler gear assembly includes a plurality of radially outwardly extending drive pins 50 that are slidably extended through openings 51 in an inner race 52 of a casing 60. The inner race 52 defines two circular sets of compartments 58 within which compression coil springs 54 encircle portions of the drive pins 50 and act upon the innermost surfaces of each compartment 58 and washers 56 secured to each of the pins 50. Thus, the springs 54 yieldably urge the drive pins 50 outwardly, but are compressible to allow for the inward movement of any one or more of the pins 50 in the event that they come into conflict with the drive lugs 38, 44 of the driving and driven gears. The casing 60 is slidably supported upon the hollow idler shaft 62 and includes a diametrically extending pin 64 that is carried by an extension shaft or plunger 66 which is slidably received within the idler shaft 62. This pin 64 extends through and is guided by diametrically opposed slots 68 in the idler shaft 62, whereby the entire idler gear assembly may be positioned at any point between the opposite longitudinal extremities of the driving gear and driven gear, without interfering with the rotation of the inner race 52 and drive pins 50 about the longitudinal axis of the idler shaft, thus providing means for transmitting power from the driving gear 36 to the driven gear 42.

As is clearly shown in Figure 1 of the drawing, the outermost end of the idler shaft 62 includes a compartment 70 which receives pressure fluid from a supply line 71 that communicates with the pressure chamber 72. A piston 74 within the cylinder 72 is used to force pressure fluid from the cylinder 72 into the chamber 70 for adjusting the position of the idler gear assembly relative to the driving and driven gears. The piston 74 is mounted upon the outermost end of a shaft 76 that is slidably supported within the axial passage 80 in the driving shaft 34. The opposite end of this shaft 76 is provided with a head 78 mounted upon the governor clutch plate 28. Thus, as the clutch and governor spider 22 rotates, the longitudinal movement of the clutch plate 28 is transmitted to the idler extension shaft 66 to control the position of the idler gear assembly along the length of the driving and driven gears.

It will now be recognized that in actual use, the slightest rotation of the splined power shaft 18 is operative to cause the weights 24 to move the clutch plate 28 into driving engagement with the friction plate 32 of the driving shaft 34, and to provide for at least partial longitudinal movement of the idler gear assembly along the length of the idler shaft 62 into power transmitting relationship with the near end of the driving gear and driven gear. As the speed of rotation of the power shaft 18 increases, the longitudinally moving clutch plate 28 will increasingly move the shaft or plunger 76 further inwardly of the chamber 72, causing the piston 74 to force a greater quantity of pressure fluid into the chamber 74 moving the extension shaft 66 further into the idler shaft 62, thus moving the idler gear assembly further toward the opposite end of the driving and driven gears, and thus increasing the drive ratio between the driving gear and the driven gear, resulting in an increased speed of rotation of the driven gear 48.

It is of course to be assumed that means is provided to return the idler 60 to its original position shown in full lines in Fig. 1 when the speed of the engine shaft 18 is reduced to idling speed. An example of such means is shown schematically in Fig. 1 in the form of a helical spring 81 mounted between the end of the shaft 66 and the end wall 82 of the hollow shaft 62.

The fact that there will not be a smooth meshing of the drive pins 50 with the lugs 38, 44 of the driving and driven gears, will not detract from the smooth and continuous transmission of power between the driving gears and driven gears since the pins 50 will readily withdraw in the event of any improper meshing thereof with the longitudinally spaced apart course of drive lugs. Thus, conical gears are provided for transmitting variable speed rotation to the driven shaft in a positive manner that is smooth acting, continuous, and economical.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. A variable speed transmission comprising a housing, a drive shaft and a driven shaft rotatably mounted in the housing in spaced parallel relationship, a conical drive gear secured on the drive shaft and a substantially identical conical driven gear secured on the driven shaft, each of said gears having a plurality of longitudinally spaced circumferential courses of lugs extending radially therefrom, an idler shaft supported in the housing between the drive shaft and the driven shafts, an idler gear comprising a cylindrical casing slidably mounted on the idler shaft for reciprocating longitudinal movement, said casing having an inner race rotatably mounted therein having a plurality of radially outwardly extending drive pins for meshing engagement with the lugs of said drive gear and said driven gear, the drive gear and the driven gear having their facing surfaces mutually parallel and parallel with the idler shaft, the idler gear being normally positioned at idling speed of the drive shaft adjacent one end of the drive gear and the driven gear, change speed means for moving the idler gear toward the other end of the drive gear and the driven gear a distance proportionate to the increase of speed of the drive shaft, and means for returning the idler gear to normal position upon return of the drive shaft to idling speed.

2. A variable speed transmission according to claim 1, wherein the dimensions of all of said lugs are equal and the distances between successive lugs of each course of lugs are equal.

3. A variable speed transmission as set forth in claim 1, said drive shaft being hollow and open at both ends, said idler shaft being hollow and closed at one end and open at the other end thereof, said change speed means comprising a first plunger slidably mounted in said idler shaft, the idler shaft having a longitudinal slot therein, means extending from said first plunger through said slot locking said casing to the plunger, said drive shaft having a second plunger slidably mounted therein, a governor on one end of the drive shaft having means for pushing said second plunger inward into the drive shaft a distance proportionate to the speed of the drive shaft, an enlarged chamber on the other end of the drive shaft having a piston therein connected to the second plunger, a supply line connecting said chamber with the open end of the idler shaft, said cylinder and said supply line having a fluid therein.

4. A variable speed transmission as set forth in claim 1, wherein said driving pins of said idler gear comprise two longitudinally spaced and circumferentially extending rows of driving pins, each one of said driving pins being slidably supported upon said inner race for reciprocating radially inward and outward movement, yieldable springs acting between said casing and each of said drive pins yieldably urging said drive pins radially outwardly of said inner race.

5. A variable speed transmission as set forth in claim 1, wherein said change speed means comprises a governor responsive to the speed of rotation of said drive shaft, and means mounted between the governor and the idler gear for moving the idler gear as aforesaid responsive to the speed of the drive shaft.

References Cited in the file of this patent
UNITED STATES PATENTS
1,378,490   Sperry _____ May 17, 1921
FOREIGN PATENTS
22,298   Great Britain _____ Oct. 3, 1913